(12) United States Patent
Tanimura et al.

(10) Patent No.: US 6,594,440 B1
(45) Date of Patent: Jul. 15, 2003

(54) TIMER SETTING CHANGING DEVICE

(75) Inventors: Kei Tanimura, Itami (JP); Masaya Kawaguchi, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/155,353

(22) PCT Filed: Mar. 21, 1997

(86) PCT No.: PCT/JP97/00958

§ 371 (c)(1),
(2), (4) Date: Sep. 25, 1998

(87) PCT Pub. No.: WO97/36295

PCT Pub. Date: Oct. 2, 1997

(30) Foreign Application Priority Data

Mar. 27, 1996 (JP) .............................. 8-072618

(51) Int. Cl.⁷ ................................. H04N 5/76
(52) U.S. Cl. ...................... 386/83; 455/186.1
(58) Field of Search ................ 386/1, 46, 83; 348/731, 734; 455/179.1, 181.1, 185.1, 186.1, 186.2; 725/39, 50; H04N 5/76, 5/91, 5/92, 9/79, 5/50

(56) References Cited

U.S. PATENT DOCUMENTS

| | | | |
|---|---|---|---|
| 4,879,611 A | 11/1989 | Fukui et al. .................. 360/69 |
| 5,047,867 A | * 9/1991 | Strubbe et al. ................ 386/83 |
| 5,488,409 A | * 1/1996 | Yuen et al. .................... 386/83 |
| 5,499,102 A | * 3/1996 | Hashimoto .................... 386/83 |
| 5,734,444 A | * 3/1998 | Yoshinobu ................ 455/185.1 |
| 5,974,218 A | * 10/1999 | Nagasaka et al. ............. 386/46 |
| 6,167,188 A | * 12/2000 | Young et al. .................. 386/83 |

FOREIGN PATENT DOCUMENTS

| | | | |
|---|---|---|---|
| EP | 0 420 123 | 4/1991 | |
| JP | 3/125356 | * 5/1991 | ........... G11B/15/02 |
| JP | 6-103640 | * 4/1994 | ........... G11B/15/02 |

* cited by examiner

*Primary Examiner*—Thai Tran
(74) *Attorney, Agent, or Firm*—Michaelson & Wallace; Peter L. Michaelson; Janet M. Skafar

(57) ABSTRACT

A timer reservation device has a reservation data store section, a reservation history store section and a clock section. The reservation data store section stores recording reservation dataset for reservation. The reservation history store section stores recording reservation data concerning recording which was executed. The clock section outputs present month and day, time, and ay of the week data. The day of the week data of the recording reservation data in the reservation history store section is compared with the day of the week data from the clock section. Month and day data of the recording reservation data is changed to be stored in said reservation data store section.

3 Claims, 7 Drawing Sheets

FIG.7

```
PR  DATE     START  END
10  01.15    19:00  19:30   ← RESERVATION1
04  01.16 WK 21:00  21:50   ← RESERVATION2
→06 01.1▩    --:--  --:--
--  --.--    --:--  --:--
--  --.--    --:--  --:--
--  --.--    --:--  --:--

[CLEAR]→TO CORRECT
[MENU]→TV
```
← REMOTE CONTROL 10-KEY TRANSMISSION a CHANNEL AND MONTH/DAY INPUT

```
PR  DATE     START  END
10  01.15    19:00  19:30
04  01.16 WK 21:00  21:50
→06 01.18 MF ▩-:--  --:--
--  --.--    --:--  --:--
--  --.--    --:--  --:--
--  --.--    --:--  --:--

[+]→DAILY/WEEKLY   ← RESERVATION TYPE SELECTION ASSIST
[CLEAR]→TO CORRECT
[MENU]→TV
```
← REMOTE CONTROL + KEY TRANSMISSION b RESERVATION TYPE INPUT

```
PR  DATE     START  END
10  01.15    19:00  19:30
04  01.16 WK 21:00  21:50
→06 01.18 MF 16:00  17▩-
--  --.--    --:--  --:--
--  --.--    --:--  --:--
--  --.--    --:--  --:--

[CLEAR]→TO CORRECT
[MENU]→TV
```
← REMOTE CONTROL 10-KEY TRANSMISSION c STARTING ENDING TIME INPUT

```
PR  DATE     START  END
10  01.15    19:00  19:30
04  01.16 WK 21:00  21:50
06  01.18 MF 16:00  17:00   ← RESERVATION3
→▩- --.--    --:--  --:--
--  --.--    --:--  --:--
--  --.--    --:--  --:--

[CLEAR]→TO CORRECT
[MENU]→TV
```
← REMOTE CONTROL OK KEY TRANSMISSION d RESERVATION SETTING COMPLETION INPUT

```
PR  DATE      START  END
04  01.30 WK  21:00  21:50
→ --  --.--      --:--  --:--
   --  --.--      --:--  --:--
   --  --.--      --:--  --:--
   --  --.--      --:--  --:--
   --  --.--      --:--  --:--

[CLEAR]→TO CORRECT
[MENU]→TV
```

(b)

```
PR  DATE      START  END
04  01.30 WK  21:00  21:50
→ 06  01.25     16:00  17:00
   --  --.--      --:--  --:--
   --  --.--      --:--  --:--
   --  --.--      --:--  --:--
   --  --.--      --:--  --:--

[CLEAR]→TO CORRECT
[MENU]→TV
```
← HISTORY DATA 1 RETURN

← REMOTE CONTROL + KEY TRANSMISSION (c)

```
PR  DATE      START  END
04  01.30 WK  21:00  21:50
→ 10  01.22     19:00  19:30
   --  --.--      --:--  --:--
   --  --.--      --:--  --:--
   --  --.--      --:--  --:--
   --  --.--      --:--  --:--

[CLEAR]→TO CORRECT
[MENU]→TV
```
← HISTORY DATA 2 RETURN

← REMOTE CONTROL + KEY TRANSMISSION

TIMER SETTING CHANGING DEVICE

TECHNICAL FIELD

The present invention relates to a timer reservation device capable of making a reservation for program recording by such a device as a video tape recorder (VTR), and particularly to an art of inputting and setting reservation data.

BACKGROUND ART

Some video tape recorders (hereinafter referred to as VTR), for example, include a clock with calendar for program reservation and have a function for timer reservation, in which reservation data is set by designating a date or a day of the week.

According to a date (month and day) input system for use in setting reservation data, four digits numerals corresponding to the month and day need to be designated. Consequently the system has a disadvantage of complicated operations.

According to a system of designating a day of the week, a date of reservation can be set by specifying only a day of the week if the date is any day within one week from the present time. However, if the date of reservation is any day after one week or more, it is required to specify which future week the date belongs to.

The user could not easily identify the future week the date belongs to unless the date is any day within about two weeks at most from the present time. Therefore the system would be difficult to use except for the case in which just a day of the week may be input for weekly reservation setting in the VTR.

The present invention was made in view of above circumstances and aims to enable the user to make a reservation for program recording without complicated operations in program reservation in such a device as the VTR.

DISCLOSURE OF THE INVENTION

A timer reservation device according to the present invention includes a reservation data store section storing recording reservation data set for reservation, a reservation history store section storing recording reservation data concerning recording which was executed, and a clock section outputting present month and day, time, and day of the week data. Data regarding a day of the week (day of the week data) of the recording reservation data in the reservation history store section is compared with the day of the week data from the clock section, and data regarding month and day (month and day data) of the recording reservation data is changed to be stored in the reservation data store section.

If the recording reservation data concerning executed recording is set for daily or weekly reservation, the recording reservation data is not stored in the reservation history store section.

Days of the week included in the day of the week data correspond to 0, 1, 2, 3, 4, 5 and 6 respectively. If the day of the week data of the recording reservation data in the reservation history store section is smaller than the day of the week data from the clock section, a value obtained by subtracting the day of the week data of the clock section from the day of the week data of the recording reservation data in the reservation history store section is added to the month and day data of the clock section to change the month and day data of the recording reservation data. If the day of the week data of the recording reservation data in the reservation history store section is larger than the day of the week data from the clock section, 7 is added to the day of the week data of the recording reservation data in the reservation history store section, and a value obtained by subtracting the day of the week data of the clock section from the result of the addition is added to the month and day data of the clock section to change the month and day data of the recording reservation data.

If the day of the week data of the recording reservation data in the reservation history store section is equal to the day of the week data from the clock section, time data of the recording reservation data is compared with the time data of the clock section. If the time data of the recording reservation data is smaller than the time data of the clock section, a value obtained by subtracting the day of the week data of the clock section from the day of the week data of the recording reservation data in the reservation history store section is added to the month and day data of the clock section to change the month and day data of the recording reservation data. If the time data of the recording reservation data is larger than the time data of the clock section, 7 is added to the day of the week data of the recording reservation data in the reservation history store section, and a value obtained by subtracting the day of the week data of the clock section from the result of the addition is added to the month and day data of the clock section to change the month and day data of the recording reservation data.

Using the timer reservation device according to the present invention as described above, reservations made frequently for the same day of the week can be input to be re-set with a simple operation by changing the date data of the recording reservation data that was previously set and used for executing reservation, based on the day of the week data thereof, and by storing the changed data.

BRIEF DESCRIPTION OF THE DRAWINGS

FIG. 7 shows a display screen in a reservation setting operation, and FIG. 8 shows a display screen in a reservation history operation.

BASE MODE FOR CARRYING OUT THE INVENTION

Embodiments of a timer reservation device according to the present invention are hereinafter described referring to FIGS. 1–5.

Figure 1:
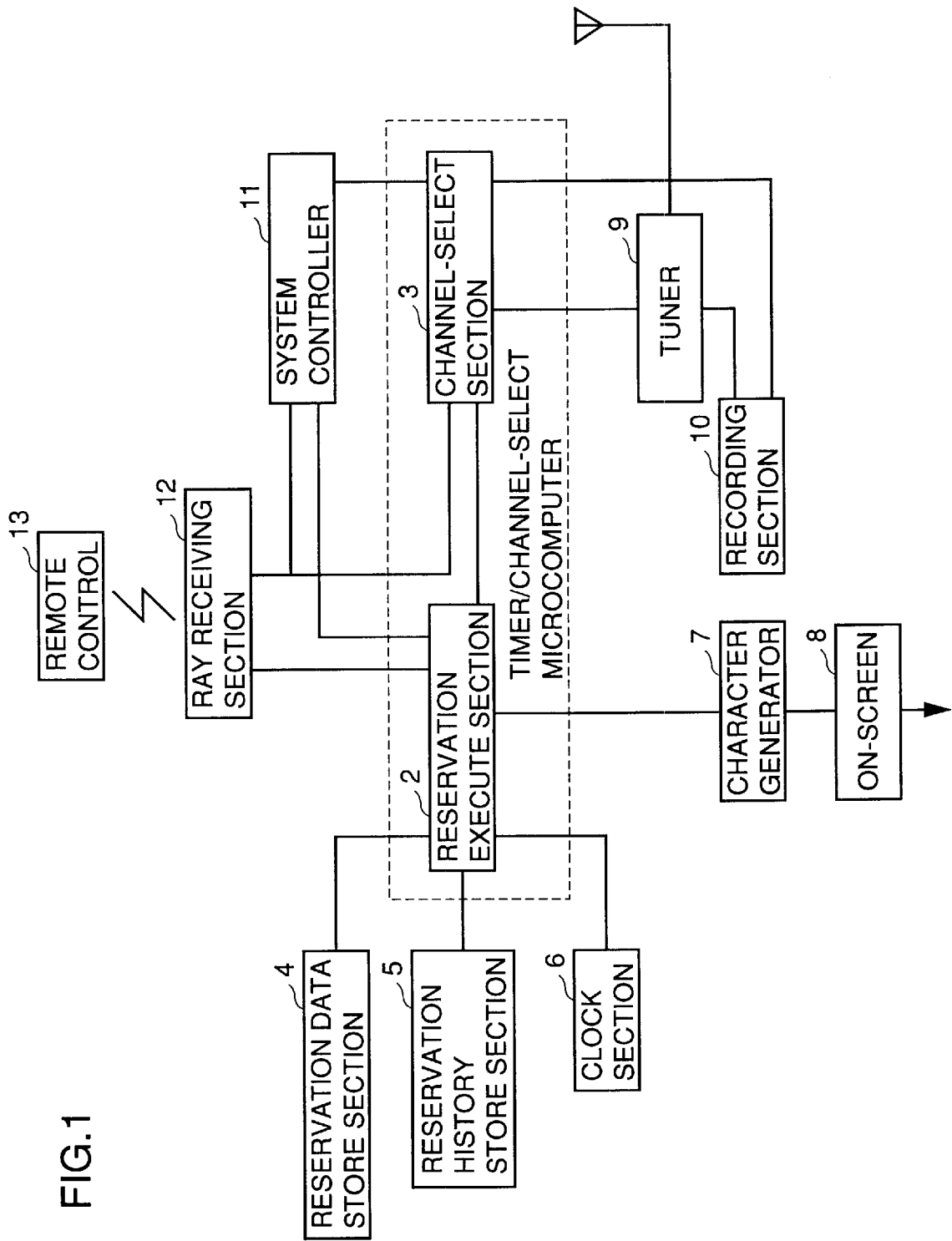
FIG. 1 shows a structure of a system of a timer reservation device according to the present invention.

FIG. 1 is a block diagram showing a structure of the timer reservation device of the present invention.

In the figure, (1) represents a timer/channel-select microcomputer including a timer reservation execute section (2) and a channel-select section (3), and controlling reserved recording as well as a tuner. (4) represents a reservation data store section storing program reservation data. (5) denotes a reservation history store section that is a buffer memory storing as a history a prescribed number of data of the data stored in reservation data store section (4) as reservation data. (6) represents a clock section that is a timer having a clock/calendar function indicating present month, day and time. (7) denotes a character generator that receives information on character codes, display location, size, and flash instruction, and converts character information to composite signals. (8) represents an on-screen display section superimposing an output from character generator (7) on a video signal to be output. (9) represents a tuner that selects any channel by tuning voltage supplied from channel-select section (3). (10) denotes a recording section that records a signal supplied from tuner (9) on a magnetic tape in accordance with an instruction from a system controller (11). (12) denotes an infrared ray receiving section that detects a signal transmitted from an infrared remote control (13).

Figure 2:
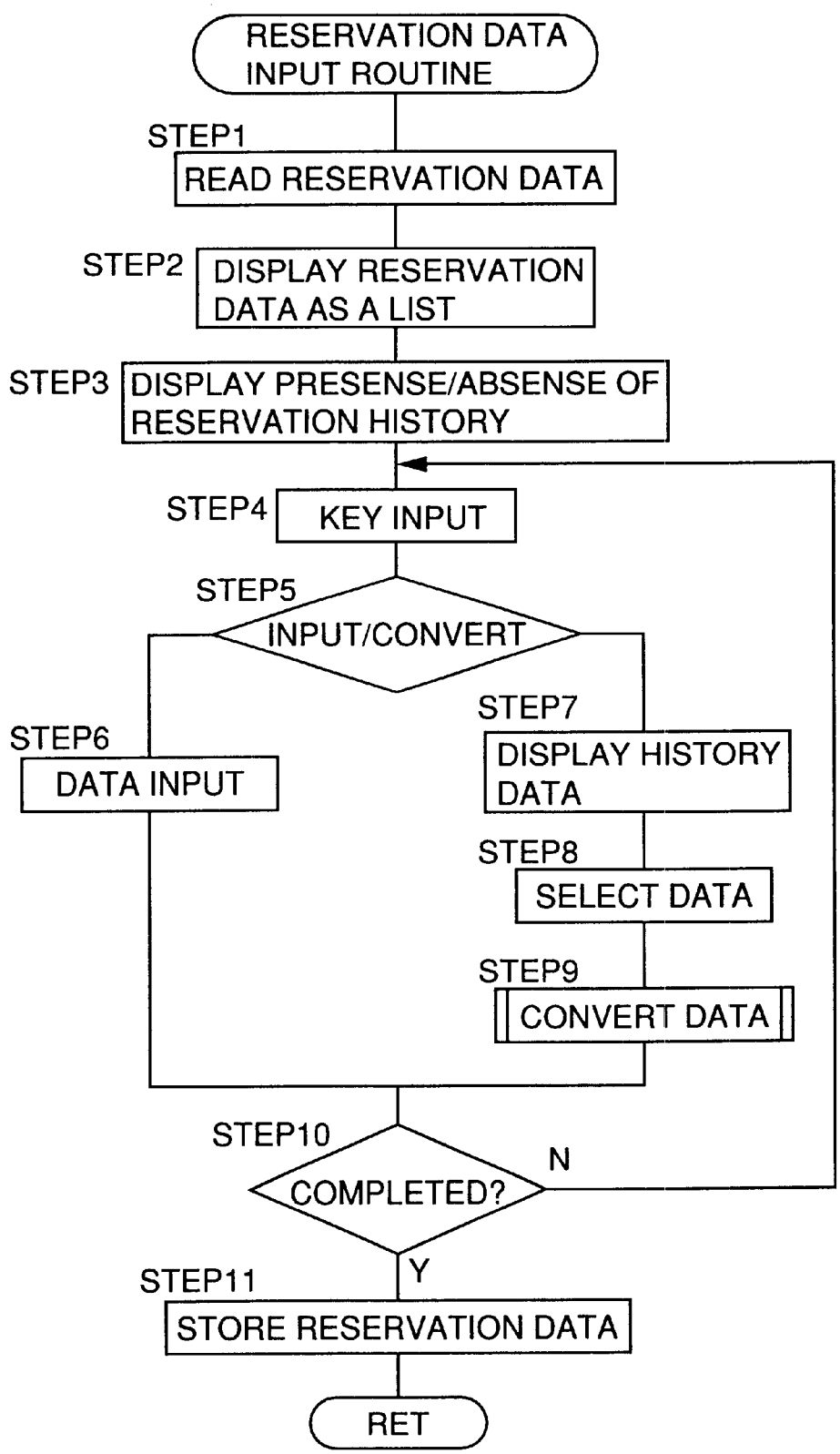
FIG. 2 shows a control flow chart of a reservation data input routine.
Figure 3:
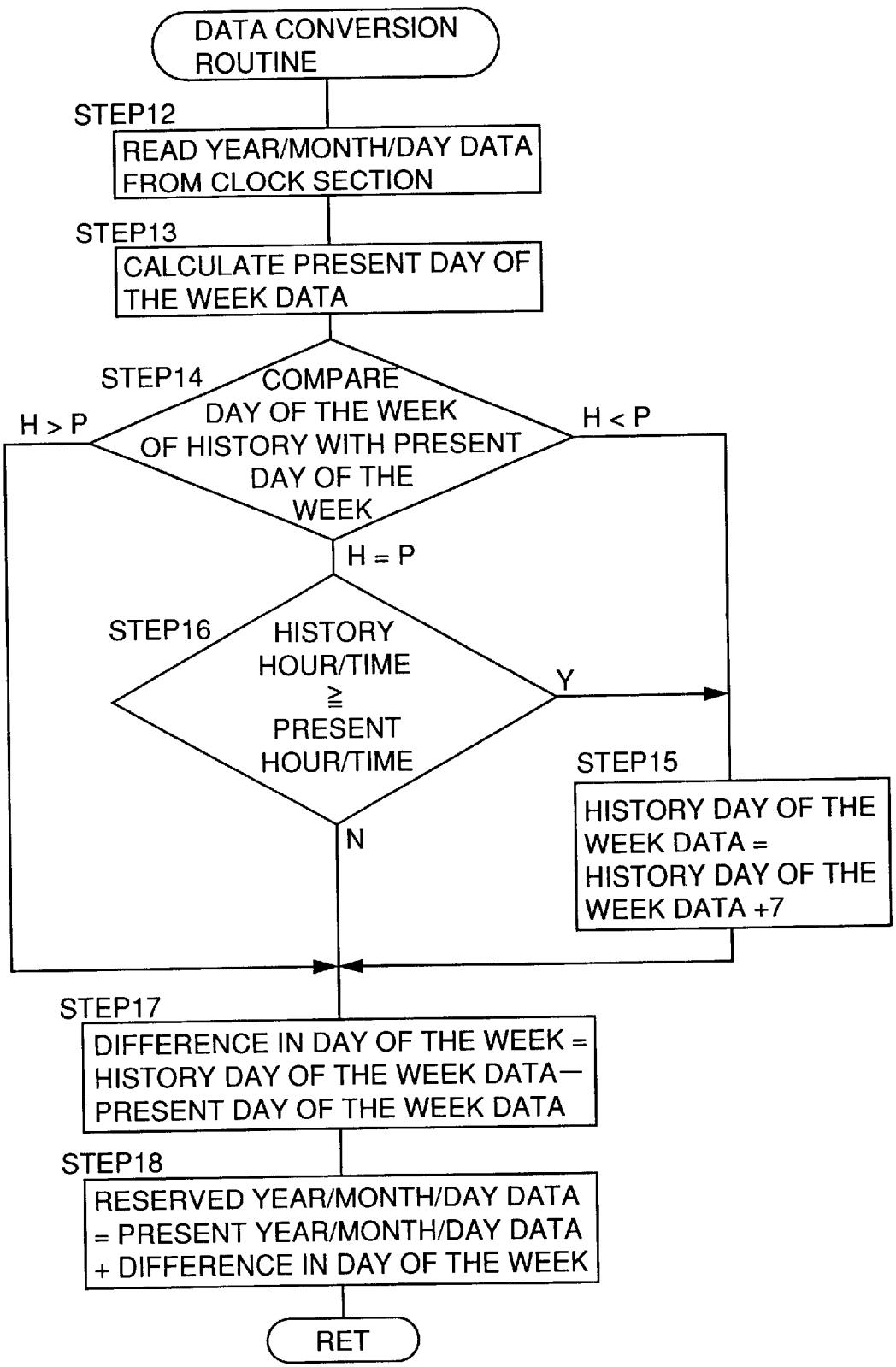
FIG. 3 shows a control flow chart of a reservation data conversion routine.
Figure 4:
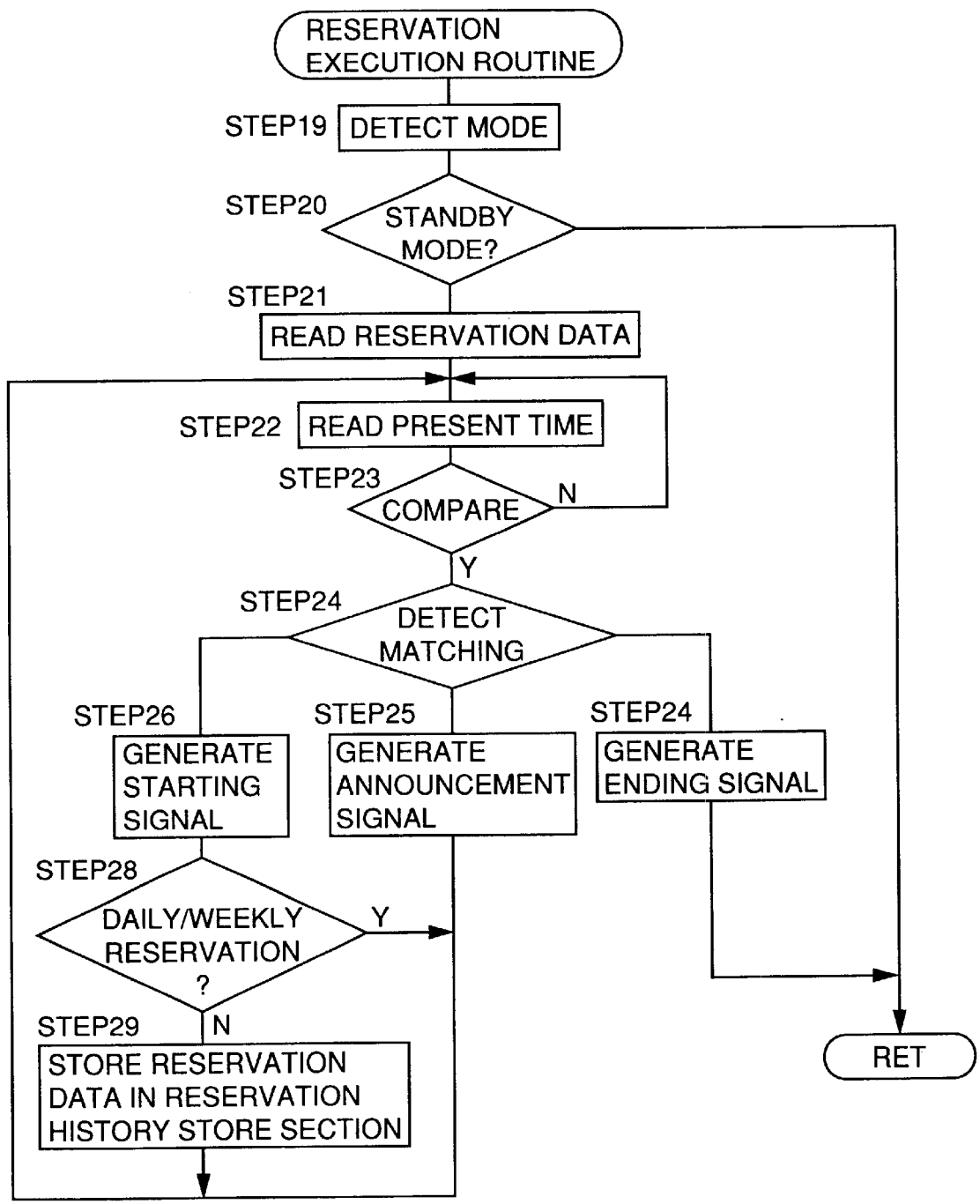
FIG. 4 shows a control flow chart of a reserved recording execution routine.

The timer reservation device is controlled according to the flow charts shown in FIGS. 2–4.

Infrared ray receiving section (12) detects an infrared pulse signal generated by pressing a reservation operation button of infrared remote control (13), converts the signal to a pulse code signal and thereafter inputs the converted signal to timer/channel-select microcomputer (1). In timer/channel-select microcomputer (1), reservation data is input in accordance with the flow chart of the reservation data input routine illustrated in FIG. 2.

After the reservation data input routine is started, data stored in reservation data store section (4) is first read in Step 1, and the data is output to character generator (7) in Step 2. The output data is displayed on a screen in the form of a list by on-screen display section (8).

Next in Step 3, whether history data is stored in reservation history store section (5) or not is checked and presence/absence of the history data is displayed on the screen.

Based on a signal input to infrared ray receiving section (12) in Step 4, it is determined in Step 5 whether reservation data is to be directly input or reservation history data is to be changed to any new reservation data.

If a determination that reservation data is to be directly input is made, reservation data is newly input to be set in Step 6.

If a determination that reservation history data is to be changed to any new reservation data is made, history data stored in reservation history store section (5) is read to be displayed on the screen in Step 7.

Based on a signal input to infrared ray receiving section (12) in Step 8, any history data to be changed is selected from the displayed data. The selected data is changed according to the data conversion routine in Step 9. Description of the data conversion routine will be given later.

After the processing in Step 6 or 9, it is determined whether an instruction to input another reservation data is given or an instruction to complete input of reservation data is given. If an instruction to input another data is issued, the control starts again from Step 4.

If an instruction to complete input of reservation data is issued, in Step 11, the input reservation data or the changed data is newly stored in reservation history store section (5) as history data, and the reservation data input routine is completed.

If there is no empty area in a region where the history data are stored in reservation history store section (5), data of the oldest date is deleted to obtain an area where new reservation data is stored as history data.

In the data conversion routine in Step 9 described above, control follows the flow chart shown in FIG. 3.

According to this process routine, values of the present year, month and day are first read from clock section (6) in Step 12. From these values, data on the present day of the week is calculated in Step 13. Values of the day of the week correspond to 0, 1, 2 . . . , 6 respectively from Sunday to Saturday, and are calculated from the number of days from a specific day to the day of the year/month/day data, and a reminder of division by 7.

Next, in Step 14, comparison is made between a value of the present day of the week and a value of a day of the week of any selected history data. If the value of the present day of the week is larger than the value of the day of the week of the history data, 7 is added to the value of the day of the week of the history data to be used as history day of the week data in Step 15.

If the value of the present day of the week is equal to the value of the day of the week of the history data in Step 14, the hour and minute of the history data is compared with the present hour and minute in Step 16. If the hour and minute of the history data is larger than the present hour and minute, 7 is added to the value of the day of the week of the history data to be used as the history day of the week data in Step 15.

If the value of the present day of the week is smaller than the value of the day of the week of the history data in Step 14 or if the hour and minute of the history data is smaller than the present hour and minute in Step 16, the value of the day of the week of the history data is not changed.

In Step 17, the value of the present day of the week is subtracted from the value of the history day of the week data to obtain a difference in the day of the week. The difference in the day of the week is added to the year, month and day of the present data to be used as date data for new reservation data.

After the processing in the reservation data input routine is completed, reserved recording is controlled following the reservation execution routine illustrated in FIG. 4.

In accordance with the reservation execution routine, an operation mode of VTR is first detected in Step 19, and whether or not the mode is a standby mode is checked in Step 20. The timer standby mode refers to a state in which a tape is loaded and the mechanism is stopped while enabling recording operation.

If the operation mode is in the timer standby state, reservation data is read from reservation data store section (4) in Step 21.

The present time is read from clock section (6) in Step 22, the present time is compared with announcement time, record starting time, and record ending time of the reservation data in Step 23, and an instruction to operate is issued by outputting a record announcement signal, a record starting signal or a record ending signal to system controller (11) in Steps 25, 26 or 27 according to data that agrees with the present time. The record announcement time refers to a time corresponding to a prescribed period of time before the record starting time at which system controller (11) prepares for recording.

After the record starting signal is output in Step 26, whether the reservation data is for daily reservation or weekly reservation is checked in Step 28. If the reservation data is not for the daily or weekly reservation, the reservation data is stored in reservation history store section (5). If the reservation data is for the daily or weekly reservation, reservation data is not stored in reservation history store section (5).

The timer reservation device of the present invention is operated as follows by the control described above.

Figure 5:
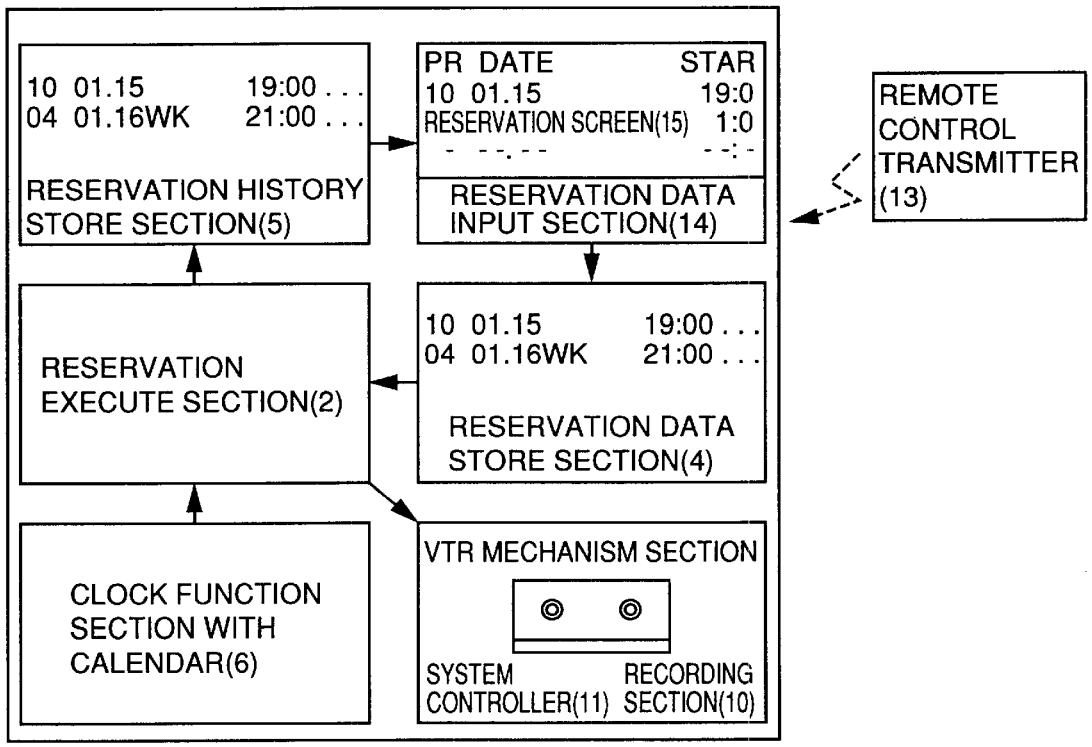
FIG. 5 is a functional block diagram of the timer reservation device of the present invention.

FIG. 5 is a functional block diagram of the timer reservation device of the present invention.

A reservation data input section (14) within the timer/channel-select microcomputer displays reservation data on a screen in the form of a list, and edits the reservation data by input, correction and the like of the reservation data following key information input from a remote control transmitter (13). Reservation data thus generated is stored in reservation data store section (4) where a plurality of reservations can be stored.

Reservation execute section (2) receives the present date and time from clock section (6), and compares them with the reservation data stored in reservation data store section (4). If there is any data that agrees with the present date and time, an instruction to start recording is given to system controller (11) and reserved recording is started.

At the start of a process of making a reservation, reservation history store section (5) calculates a day of the week on which the reservation is executed from the date of reservation data to be executed, generates reservation history data by replacing the date with the day of the week and stores the generated reservation history data.

Once the reservation is stored in reservation history store section (5), reservation data input section (14) indicates on a reservation screen (15) that there is a reservation history. By key operation of remote control transmitter (13), any of reservation history data stored in reservation history store section (5) is selected, the selected one is converted to reservation data based on the present date such that the converted reservation data corresponds to the same day of the week as the reserved day of the week in the reservation history data and corresponds to the nearest future date.

The reservation history store section stores the reservation history data in order of execution. If there is no empty area in the region where the reservation history data are stored, the oldest reservation history data is discarded to enable any new reservation history data to be stored therein.

If there is any executed reservation history data corresponding to the same day of the week and the same starting time in the reservation history data stored now, the executed reservation history data is discarded and new reservation history data is stored instead.

This operation is not carried out for data concerning daily and weekly reservation that are designated.

Accordingly, reservation data is updated in reservation history store section (5) when input for reservation is made.

When reservation data input section (14) receives a request for reservation data, history data in reservation history store section (5) are successively read out, first from the data that are stored most lately.

The day of the week of clock section (6) is compared with the day of the week of the read reservation history data, a difference in the day of the week that corresponds to the number of days from the present day of the week to the day of the week of the reservation history data is calculated, and the calculated one is added to the present date and a reservation date is determined.

If the present day of the week and the day of the week in the history agree with each other, the present time is compared with the starting time in the reservation history. If the present time is past the starting time, a reservation date is set as a day corresponding to the eighth day from the present day. If the present time is before the starting time, the present date is used directly as a reservation date.

Figure 6:
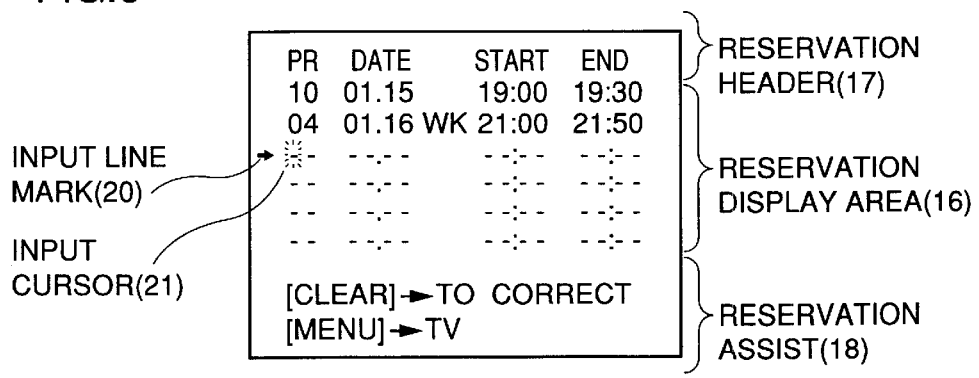
FIG. 6 shows a reservation setting display screen.

A display on the screen as shown in FIG. 6 is provided when the reservation data is set.

A reservation screen (15) is constituted of a reservation display area (16) where maximum six reservation data are displayed, a reservation header (17), and a reservation setting assist display area (18). In the reservation display area (16), reservations that have been set already are displayed in order of execution. On an empty line of reservation display area (16), an input line mark (20) is indicated, and an input cursor (21) is indicated by flashing at a position where a reservation is to be input.

Following the procedure illustrated in a to c of FIG. 7, reservations are set. A reservation for 10 channel, January 15, Monday, 19:00–19:30, and a reservation for 4 channel, January 16, Tuesday, 21:00–21:50 for weekly reservation have been set already, and description of a case in which a reservation for 6 channel, January 18, Thursday, 16:00–17:00 is additionally set is given below.

According to an ordinary reservation input, a reservation channel, a reservation day, and a reservation month are input by 10-key input of remote control (13) (see FIG. 7a). When the ten's place of a starting time is set, an indication that instructs to select a reservation type is displayed in the reservation assist area (see FIG. 7b). In this state, one of a single reservation, a weekly reservation and a daily reservation is selected by toggle operation of CH+key.

A reservation starting time and a reservation ending time are then set by using the 10-key input again (see FIG. 7c). By pressing OK key after setting the reservation ending time, the reservation being input is defined, and the input line mark moves to the next line (see FIG. 7d).

After the reservation is set and the device is brought to the standby state, both reservations for 10 channel, January 15, 19:00–19:30 and for 6 channel, January 18, 16:00–17:00 will be executed at the set time on the set day, and stored in reservation history store section (5) upon execution of the reservations, as data corresponding to 10 channel (Monday) 19:00–19:30 and to 6 channel (Thursday) 16:00–17:00, and deleted from reservation data store section (4).

On the other hand, the reservation for 4 channel, January 16, weekly, 21:00–21:50 is executed at the set time on the set day. Although the reservation is not stored in the reservation history store region, it is not deleted from the reservation data store region in order to prepare for execution in the next week.

After reserved recording is executed, if a reservation is set for January 20 (Saturday) for example, a reservation picture illustrated in a of FIG. 8 is displayed on the screen. History assist is displayed in an assist display region, urging the user to utilize the history function.

When "+" key is input, a reservation for 6 channel, January 25, 16:00–17:00 which has a reservation day corresponding to Thursday closest to January 20 calculated based on a reservation for 6 channel (Thursday) 16:00–17:00 that was executed most lately is displayed (see b of FIG. 8).

When "+" key is pressed again, a reservation for 10 channel, January 22, 19:00–19:30 is displayed based on a reservation for 10 channel (Monday) 19:00–19:30 (see c of FIG. 8). If the OK key is pressed in this state, the displayed data is defined as reservation data.

When "+" key is pressed again, the picture returns to a normal input state since the number of stored reservation history data is two (see a of FIG. 8).

INDUSTRIAL APPLICABILITY

The present invention is suitable to be applied to a timer reservation device of a record and playback apparatus such as a video tape recorder.

What is claimed is:

1. A timer setting changing device comprising:

a reservation data store section storing recording reservation data set for reservation;

a reservation history store section sequentially storing recording reservation data concerning recording which was executed, other than daily recording reservation data weekly recording reservation data; and a clock section outputting present month and day, time, and day of the week data, characterized in that said recording reservation data stored in said reservation history store section is displayed and arbitrary recording reservation data is selected, and month and day data of the selected recording reservation data is changed to be stored in said reservation data store section as new recording reservation data.

2. The timer setting changing device according to claim 1, characterized in that days of the week of the day of the week data correspond to 0, 1, 2, 3, 4, 5, and 6, if the day of the week data of the recording reservation data in said reservation history store section is smaller than the day of the week data of said clock section, a value obtained by subtracting the day of the week data of said clock section from the day of the week data of the recording reservation data in said reservation history store section is added to the month and day data of said clock section to change the month and day data of the recording reservation data, and if the day of the week data of the recording reservation data in said reservation history store section is larger than the day of the week data of said clock section, 7 is added to the day of the week data of the recording reservation data in said reservation history store section, and a value obtained by subtracting the day of the week data of said clock section from a result of the addition is added to the month and day data of said clock section to change the month and day data of the recording reservation data.

3. The timer setting changing device according to claim 2, characterized in that if the day of the week data of the recording reservation data in said reservation history store section is equal to the day of the week data of said clock section, time data of the recording reservation data is compared with the time data of said clock section, if the time data of the recording reservation data is smaller than the time data of said clock section, a value obtained by subtracting the day of the week data of said clock section from the day of the week data of the recording reservation data in said reservation history store section is added to the month and day data of said clock section to change the month and day data of the recording reservation data, and if the time data of the recording reservation data is larger than the time data of said clock section, 7 is added to the day of the week data of the recording reservation data in said reservation history store section, and a value obtained by subtracting the day of the week data of said clock section from a result of the addition is added to the month and day data of said clock section to change the month and day data of recording reservation data.

* * * * *

UNITED STATES PATENT AND TRADEMARK OFFICE
CERTIFICATE OF CORRECTION

PATENT NO. : 6,594,440 B1
DATED : July 15, 2003
INVENTOR(S) : Kei Tanimura and Masaya Kawaguchi It is certified that error appears in the above-identified patent and that said Letters Patent is hereby corrected as shown below:

<u>Title page,</u>
Item [56], References Cited, FOREIGN PATENT DOCUMENTS, insert
-- JP 7-326089   12/1995 .......... G11B/15/02
G04G/15/00 --

Signed and Sealed this

Twenty-fifth Day of November, 2003

JAMES E. ROGAN
*Director of the United States Patent and Trademark Office*